June 13, 1961  G. H. HART  2,988,625
HEATER AND THERMOSTAT CONTROL ASSEMBLY
Filed Nov. 1, 1957  2 Sheets-Sheet 2
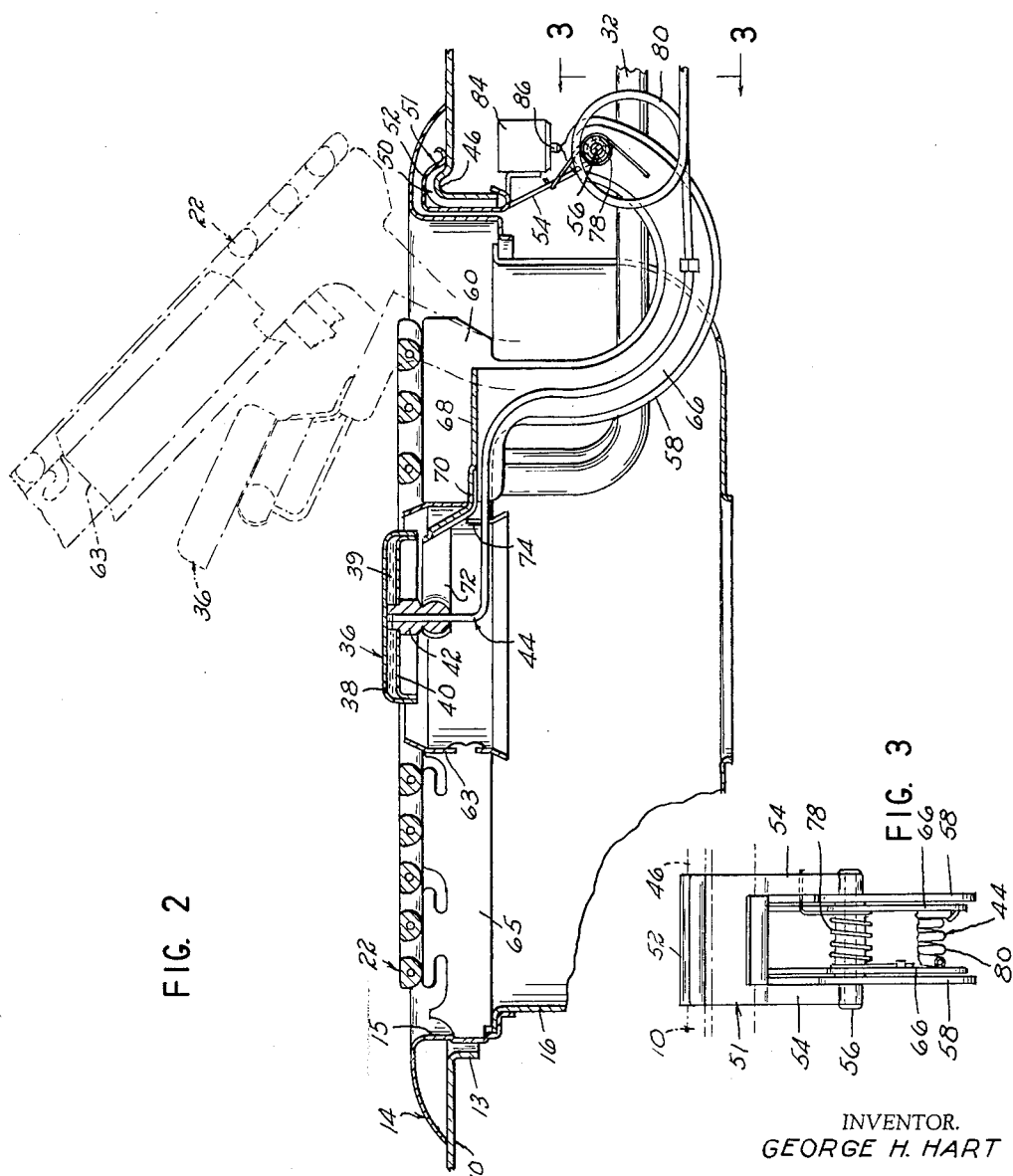
INVENTOR.
GEORGE H. HART
BY
Lindsey and Prutzman
ATTORNEYS United States Patent Office 2,988,625
Patented June 13, 1961

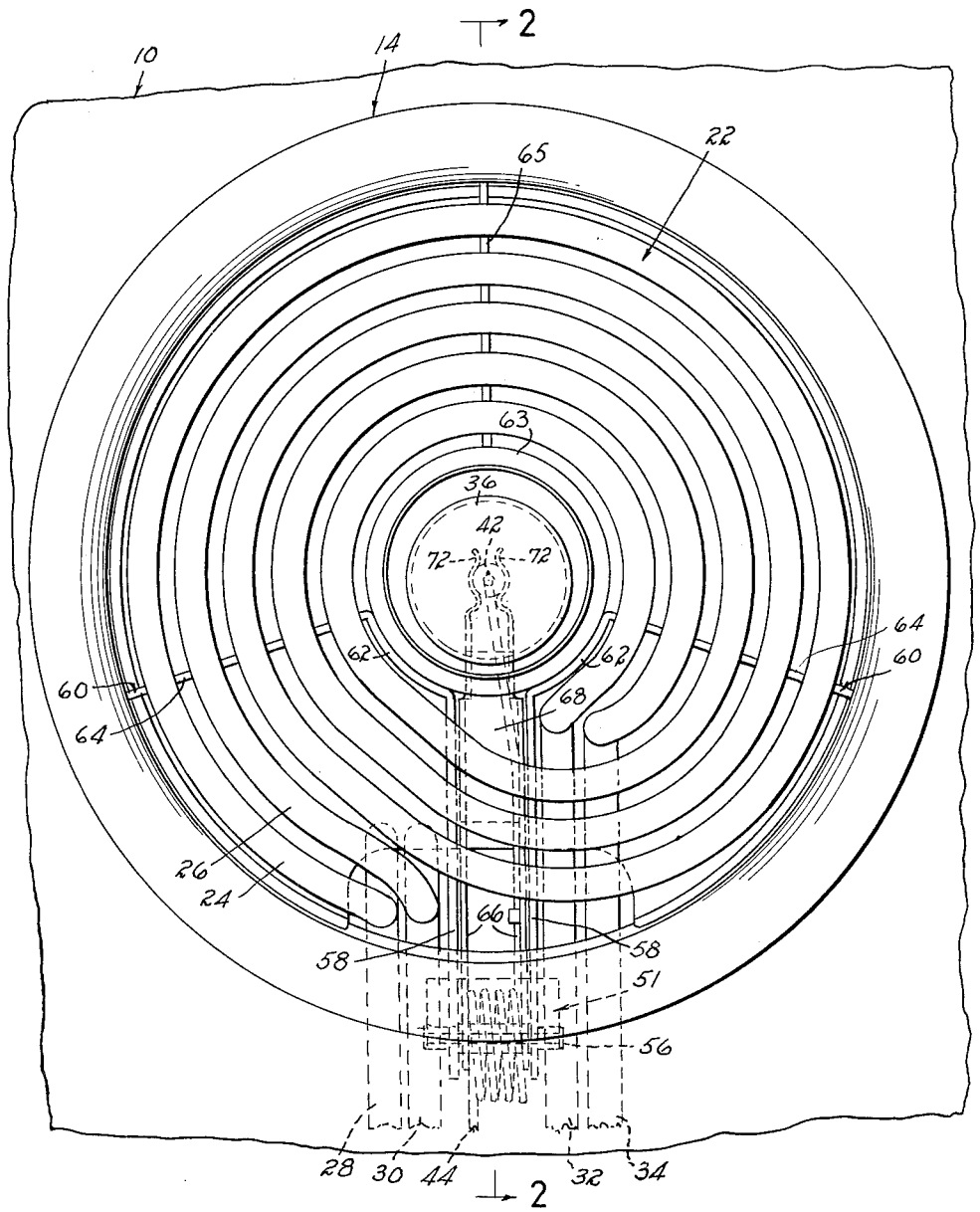

2,988,625
HEATER AND THERMOSTAT CONTROL ASSEMBLY
George H. Hart, West Hartford, Conn., assignor to The Hart Manufacturing Company, Hartford, Conn., a corporation of Connecticut
Filed Nov. 1, 1957, Ser. No. 693,836
7 Claims. (Cl. 219—37)

This invention relates to heating appliances, and more particularly to a novel and improved articulated mounting arrangement for mounting a surface heater and an associated thermostatic control element.

In heating appliances such as electric ranges wherein surface heating elements are utilized, it is desirable in some instances to provide a temperature responsive element in juxtaposition to the surface heater for engagement by the vessel being heated so as to actuate a thermostatic control and preclude over-heating of the vessel resting on the heating element. In such heating appliances, it also is desirable to mount the heating element so that it may be moved relative to the appliance to facilitate cleaning.

It is a primary object of this invention to provide a novel and improved mounting arrangement of a surface heating element and associated thermostatic control element whereby the thermostat element is supported in proper operating relationship to the heating element during a cooling operation and yet may be readily separated from the heating element, if desired, to facilitate cleaning.

It is a further object of this invention to provide a heater and thermostat element arrangement as described, which is relatively inexpensive to fabricate and assemble, which can be manufactured from readily available materials with ordinary manufacturing facilities, rugged and will provide an extended trouble-free service life, and which is attractive in appearance and convenient to use.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims:

In the drawings:

FIG. 1 is a fragmentary top view of a heating appliance having a surface heater and a temperature responsive element mounted in accordance with the invention;

FIG. 2 is a fragmentary cross-sectional view along the line 2—2 of FIG. 1; and

FIG. 3 is a fragmentary end view taken along the line 3—3 of FIG. 2 with the electric cables omitted.

With reference to the drawings, an appliance of a type with which this invention is concerned is denoted generally by the top wall 10 provided with an aperture defined by the depending flange 13. An annular decorative supporting ring 14 is engaged on the top wall 10 and is provided with a depending flange 15 extending within the flange 13. A drip pan 16 is dependingly supported on the flange 15. The surface heating element 22 of the appliance is disposed centrally of the ring 14 and comprises coils 24 and 26 connected at their opposite ends to flexible electrical cables 28, 30, 32 and 34. The cables are connected to a thermostatic switch (not shown) which is actuated by the temperature responsive element 36. The element 36 is normally disposed at the center of the heater 22 so that it will be engaged by the vessel being heated and is supported in a manner to be hereinafter described. The temperature responsive element 36 may be of any suitable type but, in the specific embodiment, comprises a pair of telescopingly engaged cup-like members 38 and 40 having their bottoms spaced apart to provide a chamber 39 therebetween. A connector 42 is mounted on and extends through the cup 40 and a capillary tube 44 is mounted in and extends centrally of the connector. The chamber 39 and capillary tube 44 contain a thermo-expansible fluid which operates a bellows or other suitable actuating arrangement at the thermostatic switch (not shown) which controls the heater 22.

The edge portion of the top 10 of the appliance is formed at 46 with an upwardly extending ridge and this ridge and the adjacent depending flange 13 are formed with reinforcing ribs 50 to provide a mounting for a spring clip 51. The clip 51 has a top portion 52 engaged over the raised portion 46 and a bottom lip hooked over the end of the flange 13. The clip 51 is further provided with a pair of downwardly inclined supporting arms or bracket 54, the end portions of which are rolled to provide bearings for a shaft or pin 56. A pair of curved mounting arms 58 are pivotally supported on the pin 56 closely adjacent and intermediate the arms 54 of the clip 51. Each arm 58 is provided at its end with an extension 60 to which the heater coils 24, 26 are secured. As shown in Fig. 1, each extension 60 has an intermediate arcuate portion 62 and a radially extending end 64. The arcuate portions 62 have secured thereto, such as by welding, a sleeve 63 disposed coaxially of the heater 22 forming a shield for the temperature responsive element 36. An auxiliary supporting strip 65 for the heater coils 24, 26 is mounted at one end on the shield 63 and extends radially therefrom. The end 64 and outer end of strip 65 are each engaged with the top of the drip pan 16 to hold the latter in place during normal operation and both are supported by the ring 14.

Disposed intermediate the supporting arms 58 are a pair of curved spaced-apart arms 66 pivotaly mounted at one end on pin 56. It is not essential, however, to use the same pivot for the arms 66 as is used for the arms 58. A web 68 extends between the other ends of the arms 66 and a supporting bracket 70 extends from the web 66 and carries a pair of spring arms 72 clampingly engaging and supporting the connector 42 of the temperature responsive element 36. In the specific embodiment, the supporting arm 66, web 68, bracket 70 and spaced-apart spring arms 72 are formed from a single piece of sheet metal bent to form the particular elements.

The shield 63 is provided with a slot or recess 74 in which the bracket 70 is engageable to limit upward movement of the thermostatic element relative to the shield and heater 22. A coil spring 78 is disposed about the shaft 56 and secured at one end to one of the arms 54 and at the other end to one of the arms 66. The spring 78 is pre-loaded so that, when the heater is in the normal position of FIG. 2, the arms 66 and thus the element 36 will be urged in a clockwise direction, as viewed in FIG. 2, and upwardly relative to the heater 22. While the force of spring 78 is sufficient to raise the thermostat element 36 it is not sufficient to also raise the relatively heavy heater unit 22.

With the heater and thermostat in the normal position of FIG. 2, the upper end of the thermostat element 36 is disposed higher than the upper surface of the heater unit 22 and thus is sure to be engaged by the bottom of a vessel placed upon the heater. Since the element 36 is able to move downwardly relative to the heater against the force of the spring 78, it will be depressed to the extent necessitated by the configuration of the vessel placed on the heater unit 22 and at the same time will be urged into firm engagement with the vessel to provide good thermal contact. The capillary tubing 44 is preferably coiled as at 80 about the shaft 56 in order to provide the necessary flexibility in the tubing consistent with the movement of the thermostatic element as described.

With a heater and thermostatic mounting arrangement constructed in accordance with the invention, it can be seen that when it is desired to clean the range the heater 22 may be manually raised or pivoted in a clockwise direction to a position such as shown in dotted lines in FIG. 2 to permit cleaning of the unit as well as the pan 16 and ring 14. As the heater is pivoted, the thermostat 36 will be moved therewith by the spring 78. However, when it is desired, for example, to clean the inside of the shield 63, the thermostatic element may be moved in a counter-clockwise direction relative to the heater to a position such as shown in dotted lines in FIG. 2.

In the specific embodiment, as a safety feature, an electric switch 84 is supported on the spring clip 52 and has an actuating plunger 86 engageable by the end of one of the heater element supporting arms 58. The switch is suitably connected in the power circuit of the heater by means (not shown) to provide that, when the end of the arm 58 is moved out of engagement with the plunger 86, the power source to the heater will be disconnected.

Thus, it can be seen that there has been provided a novel and improved means for mounting a surface heater and an associated thermostatic element on an appliance whereby relative movement of the thermostatic element is permitted and whereby the heater and thermostat may be raised as a unit relative to the appliance or may be separated as desired. The mounting arrangement is simple to manufacture and assemble and provides trouble free and efficient service over long periods of operation.

As the specific embodiment shown and described may be subject to variation and modification within the skill of the art, all such variations and modifications are intended to be included within the scope of the invention.

I claim:

1. In a heating appliance, a supporting structure having a seat for receiving a heating unit, a heating unit pivotally mounted on the supporting structure for movement between a raised position and a seated position, said heating unit having an opening for receiving a temperature responsive element, a temperature responsive element, an arm pivotally mounted on the supporting structure for movement relative to the heating unit and supporting said temperature responsive element for movement outwardly from the seat in registry with said opening of the heating unit, means biasing the arm outwardly from the seat and means limiting outward movement of the temperature responsive element relative to the heating unit.

2. In a heating appliance, a supporting structure having a seat for receiving a heating unit, a heating unit pivotally mounted on the supporting structure for movement between a raised position and a seated position, said heating unit having an opening, a temperature responsive element adapted to seat in said central opening, an arm supporting the temperature responsive element in alignment with said opening and pivotally mounted on the supporting structure for pivotal movement relative to the heating unit, means biasing the arm outwardly from said seat, and interengaging means on the heating unit and temperature responsive element limiting outward movement of the latter.

3. In a heating appliance, a supporting structure, a heating unit pivotably supported on the structure for movement between a raised and a lowered position, a temperature responsive element normally disposed centrally of the heating unit, a supporting arm carrying said temperature responsive element pivotally mounted on said frame coaxially of the pivotal axis of the heating unit for pivotal movement relative thereto, a spring urging said supporting arm in one direction of movement of the heating unit, and means on the heating unit engageable with said arm to limit movement thereof in said one direction.

4. In a heating appliance, a supporting structure, a supporting arm pivotally mounted on the supporting structure, a surface heater carried by said arm, a thermostatic element normally disposed centrally of said heater, a second supporting arm carrying said thermostatic element pivotally mounted on said frame for movement coaxially of the first arm, a spring urging said second arm in one direction of movement of the first arm, and interengaging means limiting movement of said second arm in said one direction.

5. In a heating appliance, a supporting structure having an opening provided with a recessed seat for a heating unit, a heating unit having a central opening for receiving a temperature responsive element, a first arm pivotally mounted at one end on the supporting structure and being attached at its other end to the heating unit to permit the heating unit to be pivoted therewith from said recessed seat, a temperature responsive element, a second arm pivoted at one end coaxially with the first arm and being attached at its other end to the temperature responsive element to permit the latter to move with or independently of the heating unit, means biasing the temperature responsive element outwardly of the heating unit and means limiting movement of the temperature responsive element outwardly of the heating unit.

6. In a heating appliance, a supporting structure, a pair of supporting arms pivotally mounted on said structure, a surface heater carried by said arms and having a cylindrical shield centrally thereof, a temperature responsive element normally disposed within said shield, a second pair of supporting arms carrying said temperature responsive element pivotally supported on said frame for movement coaxially of the first pair of arms, and a spring urging said second pair of arms toward said heater, said shield being engageable with said second pair of arms to limit movement of the temperature responsive element outwardly of the heater.

7. In a heating appliance, a housing having a seat for a surface heater, a pair of supporting arms pivotally mounted in said housing, a surface heater carried by said arms for movement between a raised and a seated position, a second pair of arms pivotally mounted in said housing, a thermostatic element carried by said second pair of arms and extending upwardly and centrally of said heater, a spring urging said second pair of arms in an upward direction toward the heater, a means to limit movement of said thermostatic element toward the heater, and an electric switch engageable by one of the arms of said first pair of arms, said switch being adapted to be connected in a power circuit to said heater to prevent energizing of said heater when the heater is in a raised position.

References Cited in the file of this patent

UNITED STATES PATENTS

| | | |
|---|---|---|
| 2,699,487 | Turner | Jan. 11, 1955 |
| 2,792,486 | Fry | May 14, 1957 |
| 2,919,337 | Brosseau et al. | Dec. 29, 1959 |

FOREIGN PATENTS

| | | |
|---|---|---|
| 760,296 | Great Britain | Oct. 31, 1956 |